(12) United States Patent
Chang (10) Patent No.: US 7,140,485 B1
(45) Date of Patent: Nov. 28, 2006

(54) LUBRICATION DEVICE FOR ENDLESS BELT OF TREADMILLS

(76) Inventor: Dick Chang, No. 42,Lane 12,Shenlin Rd., Shen-Kang Hsiang, Taichung Hsien (TW)

( * ) Notice: Subject to any disclaimer, the term of this patent is extended or adjusted under 35 U.S.C. 154(b) by 0 days.

(21) Appl. No.: 11/286,340

(22) Filed: Nov. 25, 2005

(51) Int. Cl.
*B65G 45/08* (2006.01)

(52) U.S. Cl. ........................................ 198/500; 482/54

(58) Field of Classification Search ............... 198/493, 198/500; 482/52, 54, 57
See application file for complete search history.

(56) References Cited

U.S. PATENT DOCUMENTS 5,433,679 A * 7/1995 Szymczak et al. .......... 198/500
5,643,144 A * 7/1997 Trulaske ..................... 198/841
2004/0266590 A1* 12/2004 Lo et al. ....................... 482/54

* cited by examiner

*Primary Examiner*—James R. Bidwell
(74) *Attorney, Agent, or Firm*—Rosenberg, Klein & Lee (57) ABSTRACT

A lubrication device for a treadmill includes a plurality of dispensing tubes connected between two rails of the frame and a plurality of apertures are defined through a wall of each dispensing tube. The dispensing apertures face an inside of the endless belt located at a lower position. A plurality of input tubes are connected the two ends of the dispensing tubes so that lubricant can be fed into the dispensing tubes via the input tubes such that the inside of the endless belt is lubricated. The customer can easily lubricate the endless belt without removing the endless belt from the frame.

8 Claims, 8 Drawing Sheets

LUBRICATION DEVICE FOR ENDLESS BELT OF TREADMILLS

FIELD OF THE INVENTION

The present invention relates to a lubrication device for lubricate the endless belt and the lubricant can be fed into the device without removing the endless belt.

BACKGROUND OF THE INVENTION

Figure 7:
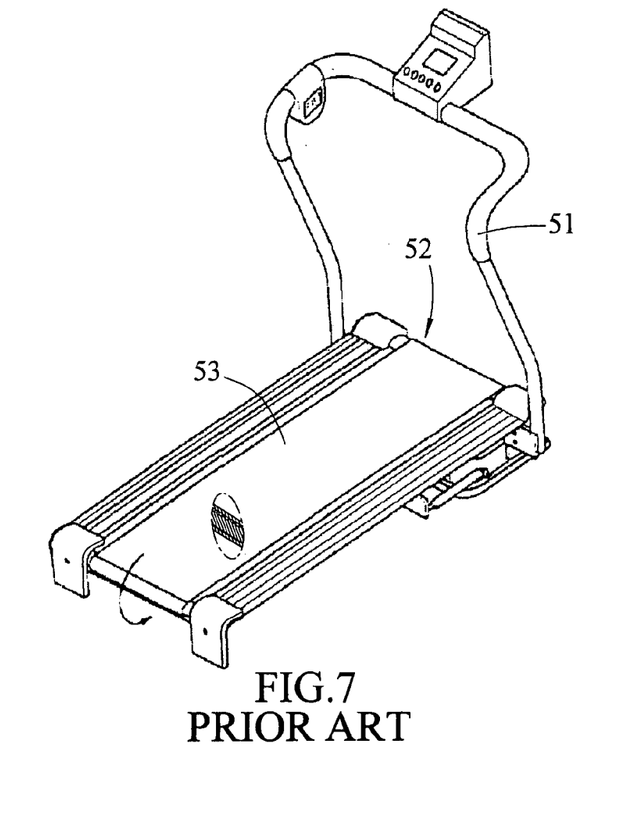
FIG. 7 shows a treadmill with a conventional lubrication device.
Figure 8:
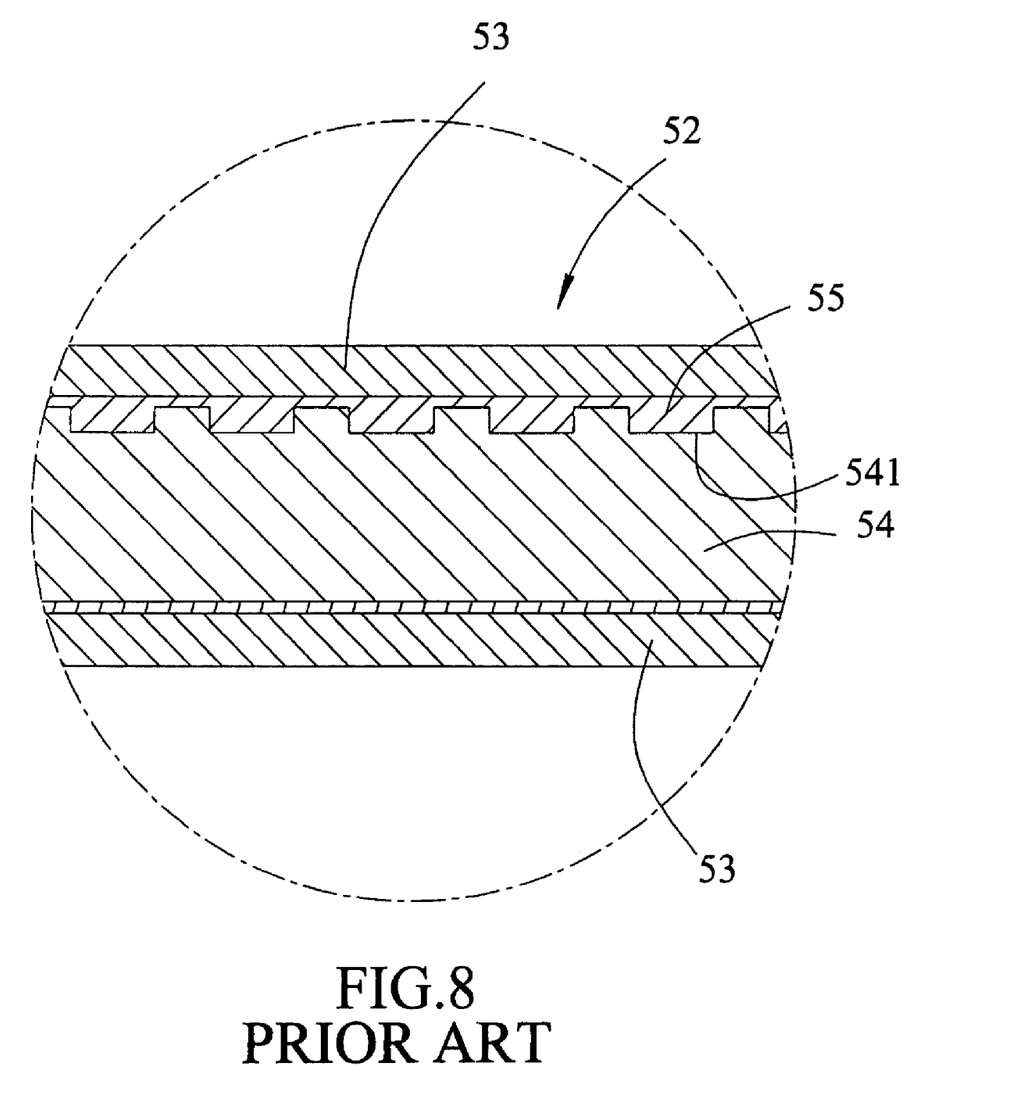
FIG. 8 shows an enlarged cross sectional view of the conventional lubrication device.

A conventional treadmill is shown in FIG. 7 and generally includes a frame 52 with a deck 54 connected between the two rails of the frame 52 and two rollers (not shown) are connected on two ends of the frame 52. An endless belt 53 reeves through the two rollers and one of the rollers is driven by a motor (not shown) so that the endless belt 53 moves at a desired speed. In order to reduce the friction between the deck 54 and the endless belt 53, a conventional lubrication device as shown in FIG. 8 is provided to feed lubricant between the deck 54 and the endless belt 53. The lubrication device includes a plurality of notches 541 defined in a top surface of the deck 54 and lubricant is filled in the notches 541 so that a layer of lubricant is established between the deck 54 and the endless belt 53. However, when the lubricant in the notches 541 needs to be refilled, the endless belt 53 has to be removed from the deck 54 of the frame 52 and this takes a lot of time and the customers cannot do the job well.

The present invention intends to provide a lubrication device for an endless belt of treadmills and the device includes a plurality of input tubes exposed on the outside of the frame so that the user can easily supply lubricant into the device without removing the endless belt from the frame.

SUMMARY OF THE INVENTION

The present invention relates to a treadmill that comprises a base and a frame which is pivotably connected to the base. A handle assembly is connected to the frame. The frame includes two rails and a deck is connected between the two rails. Two rollers are connected between the two rails and an endless belt reeves through the two rollers. A plurality of dispensing tubes are connected between the two rails and a plurality of apertures are defined through a wall of each dispensing tube. The apertures face an inside of the endless belt located at a lower position. A plurality of input tubes are connected to two sides of the frame and are connected with the two ends of the dispensing tubes so that lubricant can be fed into the dispensing tubes via the input tubes by the users.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
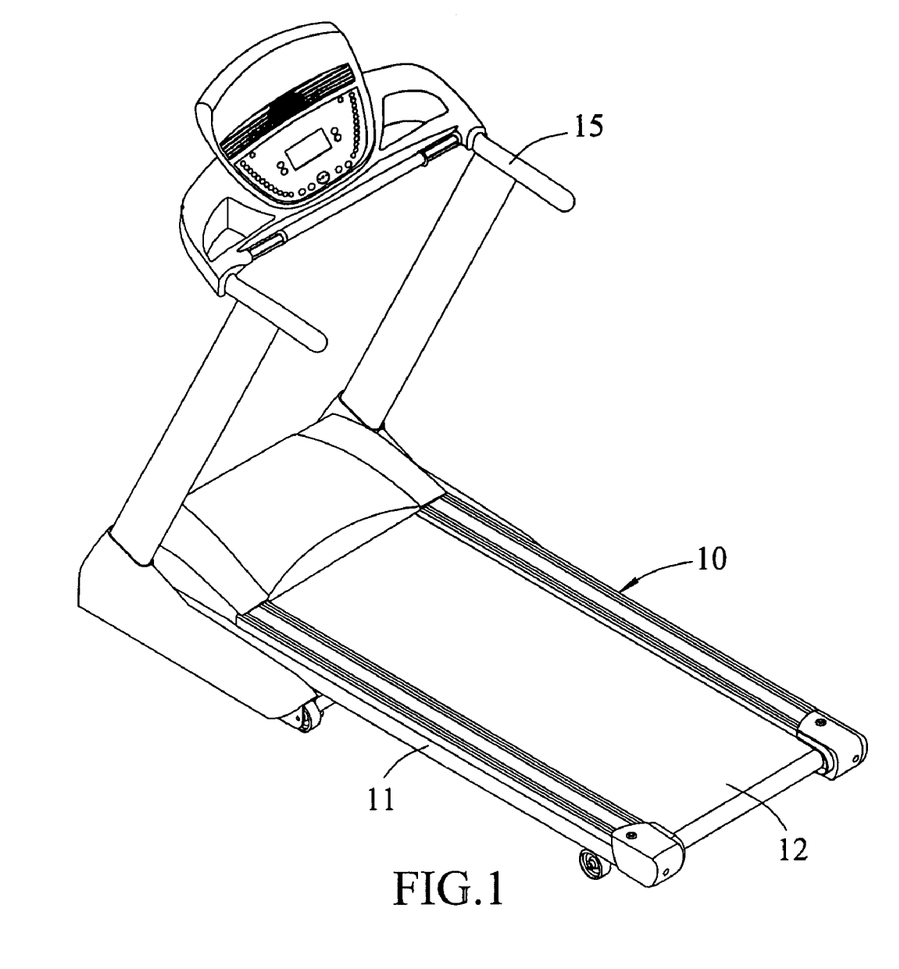
FIG. 1 is a perspective view to show the treadmill with a lubrication device of the present invention.
Figure 2:
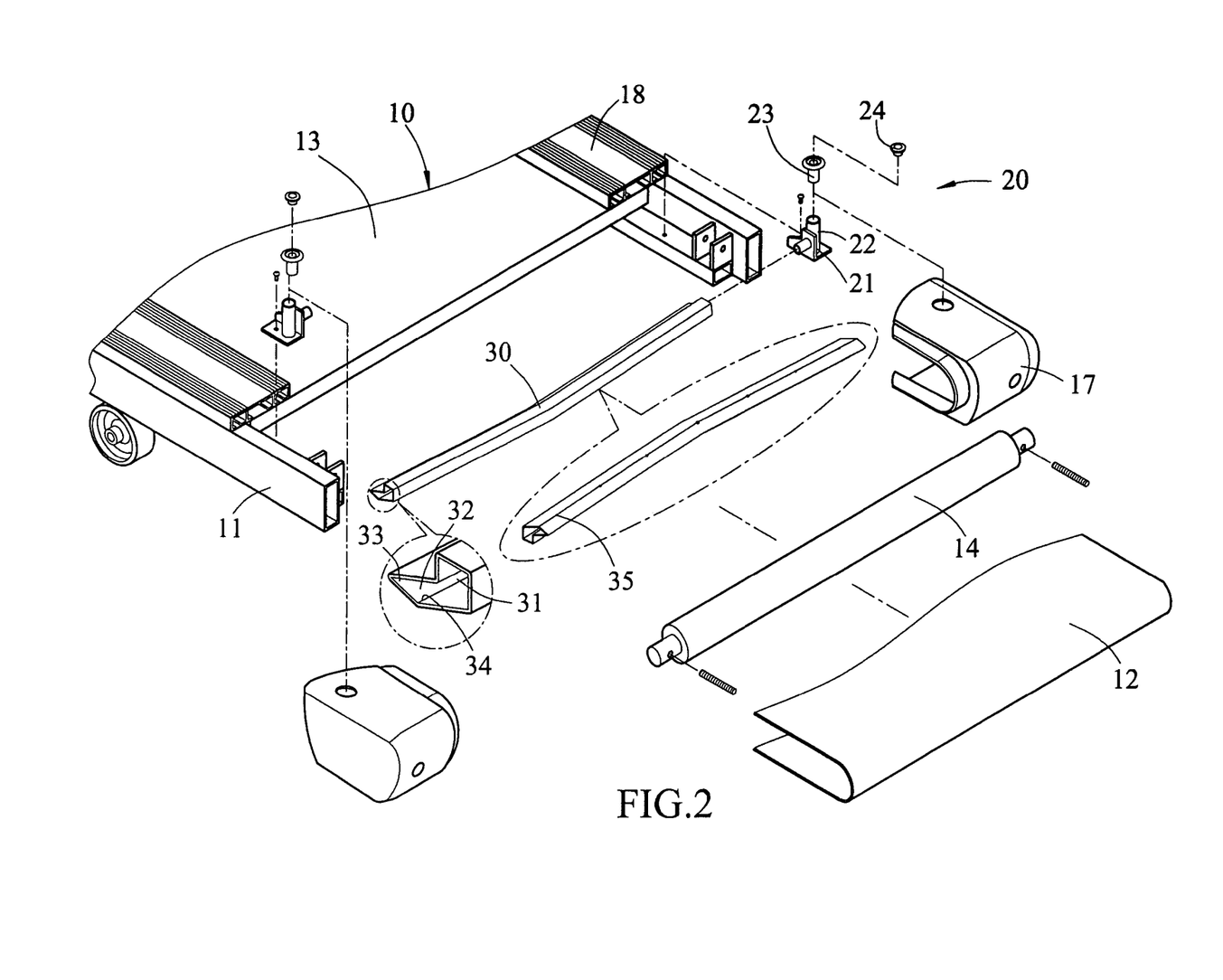
FIG. 2 is an exploded view to show lubrication device of the present invention.
Figure 3:
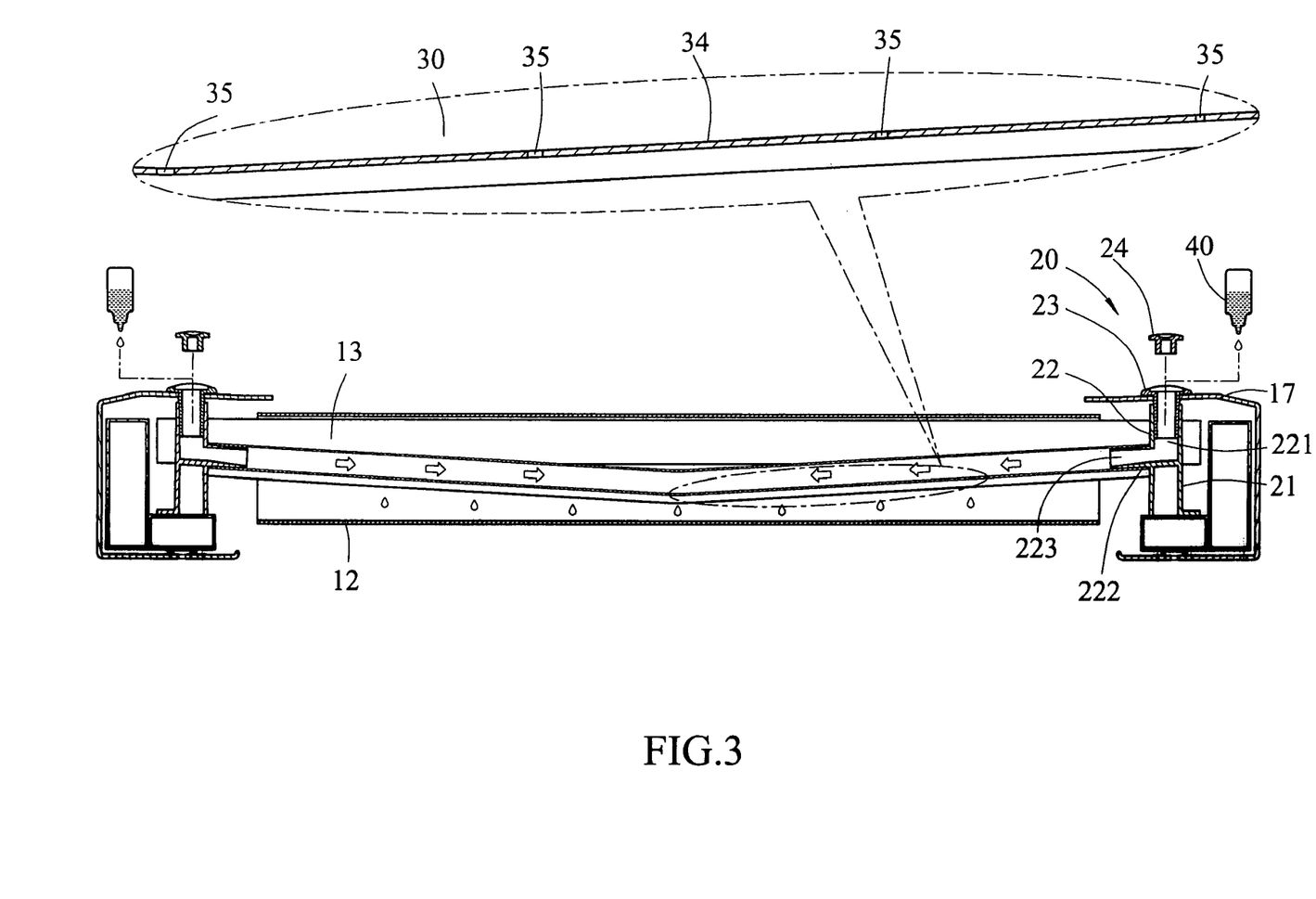
FIG. 3 is a cross sectional view to show the dispensing tubes of the lubrication device of the present invention.

Referring to FIGS. 1 to 4, a treadmill with the lubrication device of the present invention comprises a base 100 (FIG. 5) and a frame 10 which is pivotably connected to a first end of the base 100. The frame 10 includes two rails 11 and a deck 13 is connected between the two rails 11. Two rollers 14, only one is shown in FIG. 2, are connected between the two rails 11 and an endless belt 12 reeves through the two rollers 14. One of the rollers 14 is driven by a motor (not shown) so as to drive the endless belt 12. A handle assembly 15 is connected to the frame 10.

A plurality of dispensing tubes 30 are connected between the two rails 11 and each dispensing tube 30 has a lower mediate portion and two higher ends. A plurality of apertures 35 are defined through a wall of the dispensing tubes 30. The dispensing apertures 35 face an inside of the endless belt 12 located at a lower position so that when lubricant drops on the inside of the endless belt 12 and the inside of the endless belt 12 moves to a position above the deck 13, the lubricant provides necessary lubrication between the endless belt 12 and the deck 13.

A plurality of input tubes 22 are connected to two sides of the frame 10 and connected with the two higher ends of the dispensing tubes 30. Each input tube 22 includes an upright tube 221 and an inclined tube 222 which is in communication with the upright tube 221. Each of the input tubes 22 has a guide tube 23 inserted therein and a cap 24 seals the guide tube 23. Therefore, the users can easily remove the caps 24 and feed lubricant into the upright tubes 221 of the input tubes 22, because the inclined tubes 222 on the two sides of the frame 10 are connected with the two higher ends of the dispensing tubes 30 so that the lubricant can be fed into the dispensing tubes 30 and drops through the apertures 35. Two covers 17 are connected to the two ends of the rails 11 of the frame 10 to cover the input tubes 22 up and the guide tubes 23 extend through holes in the covers 17.

Figure 4:
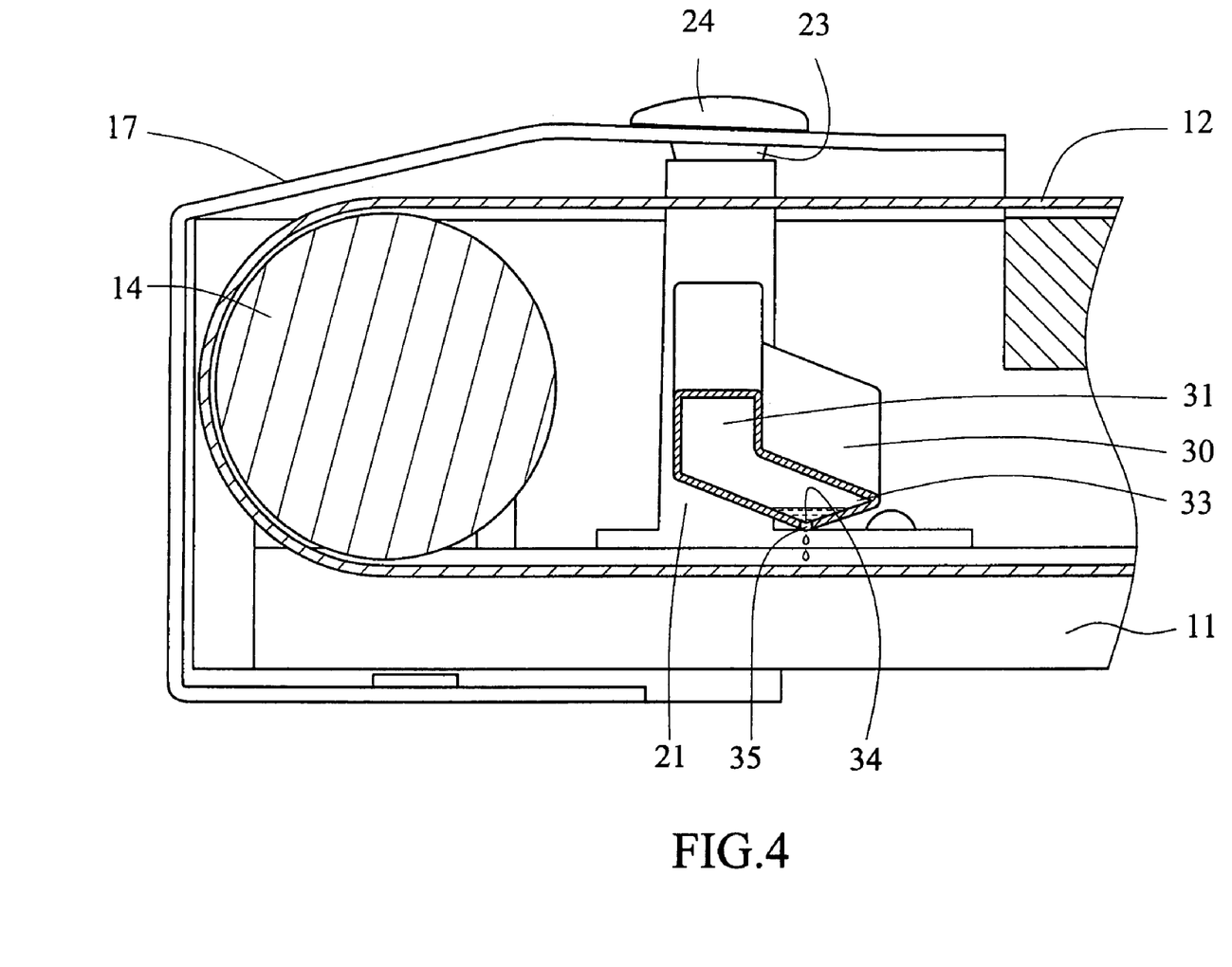
FIG. 4 is an enlarged view to show the lubricant drops from the apertures of the dispensing tubes.

As shown in FIG. 4, each dispensing tube 30 is a L-shaped tube and has an upright section 31 and an inclined section 32 which is in communication with the upright section 31. The inclined section 32 has a dispensing portion 34 and a collection portion 33, wherein the dispensing portion 34 is located lower then the connection portion 33 when the frame 10 is located horizontally. The apertures 35 are defined through the dispensing portion 34 so that the lubricant drops through the apertures 35. In order to evenly lubricate the endless belt 12, the sizes of the apertures 35 are made different, the apertures 35 located close to the two higher ends have smaller sizes compared with larger sizes of the apertures 35 located close to the lower mediate portion. By this way, when first pouring the lubricant into the dispensing tubes 30, sufficient amount of the lubricant drops from the smaller apertures 35 and when the lubricant flows to the mediate portion, only small amount of the lubricant is left, so that the apertures 35 at the mediate portion has larger sizes so that the lubricant can drop efficiently. Therefore, the lubricant can be spread evenly along the dispensing tubes 30.

Figure 5:
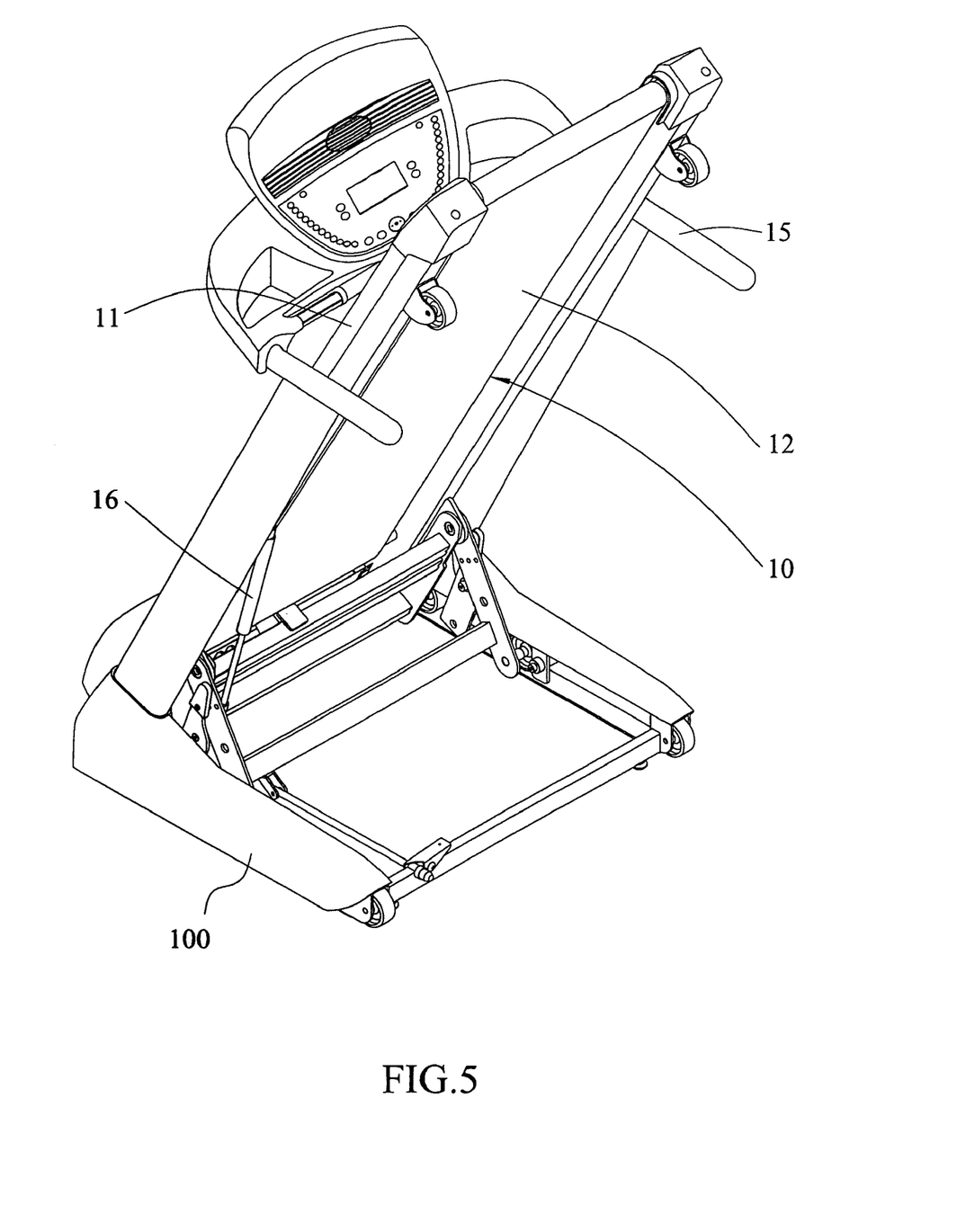
FIG. 5 shows that the frame is pivoted to upright position.
Figure 6:
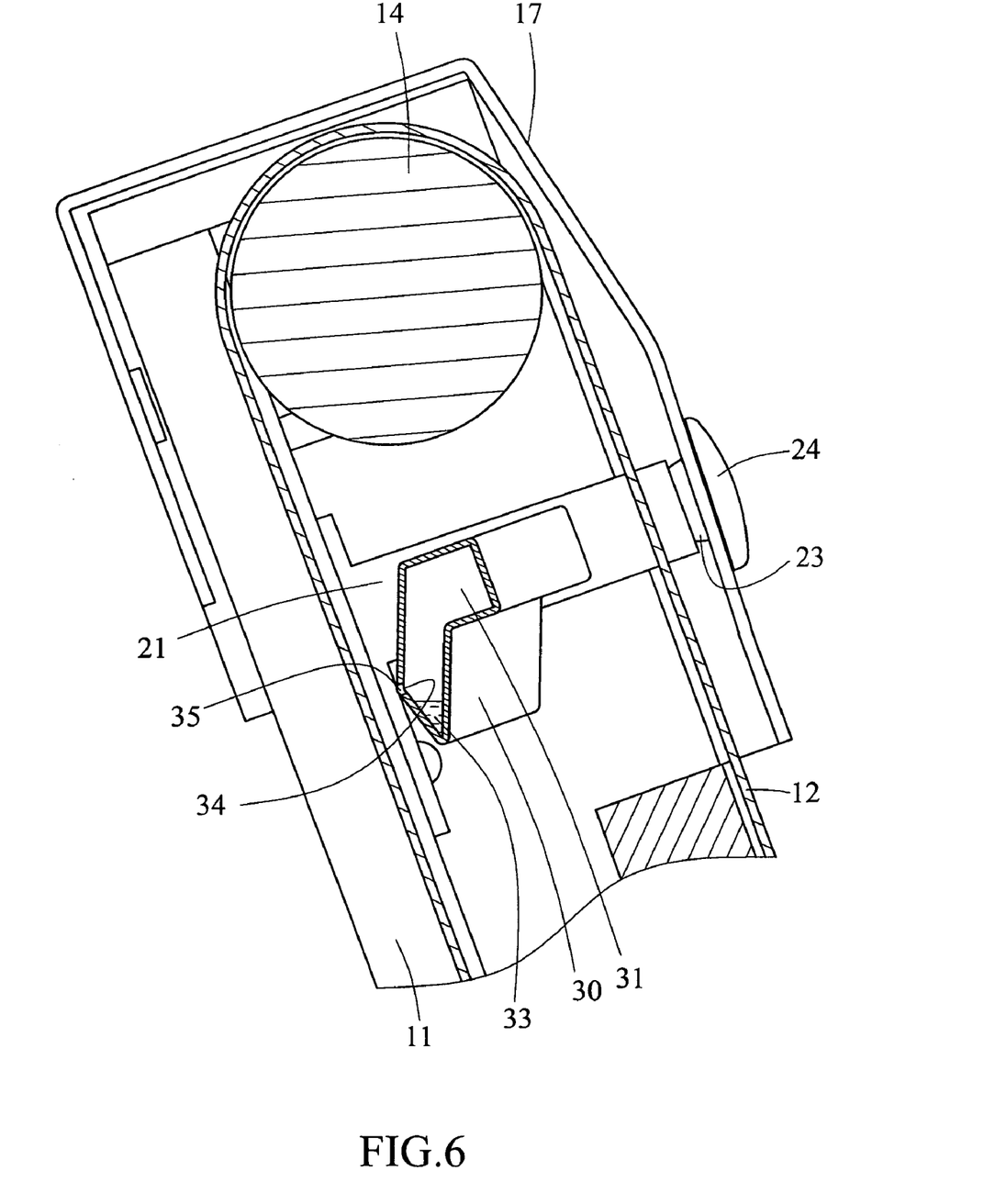
FIG. 6 shows that the lubricant is collected in the collection portion of the dispending tubes.

Referring to FIGS. 5 and 6, when the frame 10 is pivoted to upright position relative to the base 100 by the at least one cylinder 16 connected between the base and an underside of the frame 10, the connection portion 33 of each dispensing tube 30 has a V-shaped cross section and a tip end of the V-shaped cross section faces downward, so that the lubricant will be collected in the collection portion 33 can will not contaminate other parts.

While we have shown and described the embodiment in accordance with the present invention, it should be clear to those skilled in the art that further embodiments may be made without departing from the scope of the present invention.

What is claimed is:

1. A treadmill comprising:
 a base and a frame pivotably connected to the base, a handle assembly connected to the frame, the frame including two rails and a deck connected between the two rails, two rollers connected between the two rails and an endless belt going around through the two rollers;
 a plurality of dispensing tubes connected between the two rails and a plurality of apertures defined through a wall of each dispensing tube, the apertures facing an inside of the endless belt located at a lower position, and
 a plurality of input tubes connected to two sides of the frame and connected with the two ends of the dispensing tubes.

2. The treadmill as claimed in claim 1, wherein each dispensing tube has a lower mediate portion and two higher ends.

3. The treadmill as claimed in claim 1, wherein each dispensing tube is an L-shaped tube and has an upright section and an inclined section which is in communication with the upright section, the inclined section has a dispensing portion and a collection portion, the dispensing portion is located lower then the connection portion when the frame is located horizontally, the apertures are defined through the dispensing portion.

4. The treadmill as claimed in claim 3, wherein the connection portion of each dispensing tube has a V-shaped cross section and a tip end of the V-shaped cross section faces downward when the frame is pivoted to right position.

5. The treadmill as claimed in claim 1, wherein each dispensing tube has a lower mediate portion and two higher ends, the apertures located close to the two higher ends have smaller sizes when compared with larger sizes of the apertures located close to the lower mediate portion.

6. The treadmill as claimed in claim 2, wherein each input tube includes an upright tube and an inclined tube which is in communication with the upright tube, the inclined tubes on the two sides of the frame connected with the two higher ends of the dispensing tubes.

7. The treadmill as claimed in claim 1, wherein each of the input tubes has a guide tube inserted therein and a cap seals the guide tube.

8. The treadmill as claimed in claim 1, wherein at least one cylinder is connected between the base and an underside of the frame.

\* \* \* \* \*